United States Patent Office 3,020,310
Patented Feb. 6, 1962

3,020,310
PROCESS FOR THE PRODUCTION OF TERTIARY CYANOETHYLATED AMINES
George W. Fowler, South Charleston, and John W. Lynn, Charleston, W. Va., assignors to Union Carbide Corporation, a corporation of New York
No Drawing. Filed Aug. 12, 1960, Ser. No. 49,143
10 Claims. (Cl. 260—465.5)

This invention relates to the cyanoethylation of weakly basic amines. More particularly, the present invention relates to a process for the production of tertiary cyanoethylated amines.

This application is a continuation-in-part of co-pending application, Serial No. 694,905, entitled "Process for the Production of Tertiary Cyanoethylated Amines," by George W. Fowler and John W. Lynn, filed November 7, 1957, now abandoned, and assigned to the same assignee as the instant application.

It is known that acrylonitrile and certain weakly basic aliphatic amines will not readily react to any appreciable extent. For instance, 3,3'-iminodipropionitrile, a secondary amine which is a relatively weak aliphatic base produced by the reaction of acrylonitrile and ammonia, will not readily react with acrylonitrile to produce 3,3',3''-nitrilotripropionitrile. As another illustration, N,N'-bis(2-cyanoethyl)ethylenediamine, which is produced by reacting ethylenediamine with acrylonitrile, is a relatively weak base and, although it possesses two active hydrogen atoms, it will not react to any appreciable extent to produce the compound 3,3',3'',3'''-(ethylenedinitrilo)tetrapropionitrile.

We have discovered that, by the utilization of an organic acidic catalyst, weakly basic aliphatic secondary amines can readily be cyanoethylated with acrylonitrile. For example, we have found that, by using the process of our invention, 3,3'-iminodipropionitrile and N,N'-bis(2-cyanoethyl)ethylenediamine will react with acrylonitrile to produce, respectively, the cyanoethylated amines 3,3',3''-nitrilotripropionitrile and 3,3',3'',3'''-(ethylenedinitrilo)tetrapropionitrile with high yields and efficiencies.

Broadly stated, the process of the present invention comprises the catalyzed cyanoethylation of weakly basic amines with acrylonitrile, wherein the catalyst utilized is an organic acid.

More specifically, the process of the present invention comprises admixing a weakly basic amine, for example 3,3' - iminodipropionitrile or N,N'-bis(2 - cyanoethyl)-ethylenediamine, with acrylonitrile and an organic acid catalyst and heating the resulting mixture under reflux conditions at a temperature of from about 50° C. to about 150° C. and preferably from 70° C. to 150° C. and a pressure of from about atmospheric pressure to about autogenous pressure (at the reaction temperature) for a period of between about 7 and 20 hours.

The organic acid catalyst may be an alkanoic acid, preferably a lower alkanoic acid containing from 2 to 6 carbon atoms, an aromatic acid or an arylsulfonic acid. For example, it may be acetic acid, propionic acid, n-butyric acid, valeric acid, caproic acid, benzoic acid, p-toluene sulfonic acid and the like. The preferred catalyst is acetic acid, because it is inexpensive and because it is a good solvent for the reaction products. The organic acid catalyst may be utilized in amounts from about 5 to about 100 percent of the reactants but is preferably used in an amount from about 10 to about 50 percent of the reactants.

The reactants should preferably be present in a mol ratio of from about 1 to 20 mols of acrylonitrile to every mol of weakly basic amine. In the case of 3,3'-iminodipropionitrile, preferably 1 to 5 mols of acrylonitrile are utilized per mol of the propionitrile. In the case of N,N'-bis(2-cyanoethyl)ethylenediamine, preferably 2 to 10 mols of acrylonitrile are utilized per mol of the diamine. An excess of acrylonitrile is preferred, because it helps to achieve a substantially complete reaction.

A preferred embodiment of this invention comprises heating the reaction mixture to a temperature of between about 50° C. and 150° C. while slowly adding the acrylonitrile to the system. In this manner, substantial control of the rate of reaction may be maintained at all times. Hydroquinone and similar polymerization inhibitors may be present during the reaction but such materials are not essential.

The product may be recovered by crystallization of the concentrated reaction mixture remaining after any unreacted acrylonitrile is distilled off.

The following examples are illustrative. The apparatus utilized in these examples comprised conventional distillation equipment, including a reflux kettle, a distillation column, condenser and a recovery receptacle.

Example I

A mixture of about 369 grams of 3,3'-iminodipropionitrile, about 175 grams of acrylonitrile and about 1 gram of hydroquinone was introduced into a kettle and refluxed at a temperature between about 75° C. and 157° C. at atmospheric pressure. The mixture was maintained at reflux for about 9 hours, during about the first 2 hours of which about 40 grams of acetic acid was gradually added to the mixture in the kettle. At the conclusion of the reflux period, substantially all of the unreacted acrylonitrile remaining in the kettle was removed by distillation at a temperature of about 190° C. under a reduced pressure of about 2 mm. of mercury. The residue remaining in the kettle was crystallized from hot methanol and about 296 grams of 3,3',3''-nitrilotripropionitrile having a melting point temperature of between about 58.5° C. and 59.5° C. was recovered. The product was obtained with a yield of about 70 percent, based on 3,3'-iminodipropionitrile.

Example II

A mixture of about 123 grams of 3,3'-iminodipropionitrile, about 38 grams of p-toluene sulfonic acid, about 0.3 gram of hydroquinone and about 50 ml. of xylene was introduced into a kettle and refluxed at a temperature between about 102° C. and 115° C. at atmospheric pressure. The total reflux period was about 24 hours, during the first four hours of which about 106 grams of acrylonitrile was gradually added to the mixture in said kettle. At the conclusion of the total reflux period, substantially all of the unreactive acrylonitrile and other low boiling unreactive compounds remaining in the kettle were removed by distillation at a temperature of about 115° C. under a reduced pressure of about 5 mm. of mercury. The residue remaining in the kettle was crystallized from hot methanol and about 106 grams of 3,3',3''-nitrilotripropionitrile having a melting point temperature of about 57° C. was recovered. The product was obtained with a yield of about 60 percent, based on 3,3'-iminodipropionitrile.

Example III

A mixture of about 123 grams of 3,3'-iminodipropionitrile, about 212 grams of acrylonitrile, about 56 grams of benzoic acid, and about 0.3 gram of hydroquinone was introduced into a kettle and refluxed at a temperature between about 80° C. and 150° C. at atmospheric pressure. The total reflux period was about 10 hours. At the conclusion of this total reflux period, substantially all of the unreacted acrylonitrile remaining in the kettle was removed by distillation at a temperature of about 105° C. under a reduced pressure of about 6 mm. of mercury. The residue remaining in the kettle was crystallized from hot methanol and about 225 grams of 3,3'3"-nitrilotripropionitrile having a melting point temperture of about 56.5° C. was recovered. The product was obtained with a yield of about 72 percent, based on 3,3'-iminodipropionitrile.

*Example IV*

A mixture of about 696 grams of about 86 percent by volume aqueous ethylenediamine, about 200 grams of acetic acid and about 15 grams (about 1 weight percent) of hydroquinone was introduced into a kettle and refluxed at a temperature of about 50° C. at atmospheric pressure. The total reflux period was about 16 hours, during the first 2 hours of which about 1272 grams of acrylonitrile was gradually added to the mixture in said kettle. At the conclusion of the total reflux period, substantially all of the unreacted acrylonitrile remaining in the kettle was removed by distillation at a temperature of about 115° C. under a reduced pressure of about 5 mm. of mercury. About 1500 ml. of methanol were added to the residue remaining in the kettle and the resulting mixture was heated to a temperature of about 50° C., after which the contents of the kettle were cooled to facilitate the crystallization of unrefined 3,3',3",3"'-(ethylenedinitrilo)tetrapropionitrile. This product was recrystallized from hot methanol and was found to have a melting point temperature of between about 64° C. and 65° C. The product was obtained with a yield of about 40 percent.

*Example V*

A mixture of about 390 grams of about 77 percent by volume aqueous ethylenediamine and about 265 grams of acrylonitrile was introduced into a kettle and refluxed for about 2 hours at a temperature of about 85° C. At the conclusion of this reflux period the contents of the kettle were distilled to a kettle temperature of about 200° C. under a reduced pressure of about 2 mm. of mercury, and about 253 grams of N-(2-cyanoethyl)ethylenediamine product was recovered. The 253 grams of this product and about 371 grams of acrylonitrile was introduced into a kettle and refluxed at a temperature of about 60° C. for about 7 hours. At the conclusion of this second reflux period, substantially all of the unreacted acrylonitrile was removed from the kettle by distillation at a temperature of about 100° C. under a reduced pressure of about 4 mm. of mercury. To the residue remaining in the kettle, which consisted of about 330 grams of a mixture of N,N'-bis(cyanoethyl)ethylenediamine and N,N,N'-tris(2-cyanoethyl)ethylenediamine, was added about 250 grams of acrylonitrile and this resulting mixture was refluxed at a temperature of about 100° C. for about a 14 hour period. At the end of this period, substantially all of the unreacted acrylonitrile remaining in the kettle was removed by distillation at a temperature of about 100° C. under a pressure of about 10 mm. of mercury. To the residue remaining in the kettle was added about 250 grams of acrylonitrile and about 50 grams of acetic acid, and the resulting mixture was refluxed for about a 7 hour period at a temperature between about 90° C. and 110° C. At the end of this period, substantially all of the acrylonitrile was removed from the kettle by distillation at a temperature of about 135° C. under a reduced pressure of about 3 mm. of mercury. The residue remaining in the kettle was crystallized from hot methanol and about 119 grams of 3,3',3",3"'-(ethylenedinitrilo)tetrapropionitrile having a melting point temperature of between about 64° C. and 65° C. was recovered. The product was obtained with a yield of about 10 percent.

*Example VI*

A mixture of about 123 grams of 3,3'-iminodipropionitrile, about 212 grams of acrylonitrile, about 42 grams of propionic acid, and about 0.1 gram of hydroquinone was introduced into a kettle and refluxed at a temperature of about 82° C. at atmospheric pressure. The total reflux period was about 16 hours. At the conclusion of this total reflux period, substantially all of the unreacted acrylonitrile remaining in the kettle was removed by distillation under a reduced pressure. The residue remaining in the kettle was crystallized from hot methanol. The product, 3,3',3"-nitrilotripropionitrile, having a melting point temperature of 57–58° C. was recovered. The product was obtained with a yield of about 66 percent, based on 3,3'-iminodipropionitrile. The infrared spectrum exhibited the characteristic nitrile maximum at 4.4$\mu$ and was void of absorption at 2.9$\mu$ to 3.1$\mu$ which would indicate unreacted secondary amine.

What is claimed is:

1. A process for the cyanoethylation of weakly basic aliphatic amines which comprises reacting a weakly basic aliphatic amine selected from the group consisting of 3,3'-iminodipropionitrile and N,N'-bis(2-cyanoethyl)ethylenediamine with acrylonitrile in the presence of from about 5 to about 100 percent, based on the total amount of acrylonitrile and amine, of an organic acid catalyst selected from the group consisting of lower alkanoic acids, benzoic acid, and paratoluene-sulfonic acid at a temperature of from about 50° C. to about 150° C.

2. A process for the cyanoethylation of a weakly basic aliphatic amine which comprises reacting a weakly basic aliphatic amine selected from the group consisting of 3,3'-iminodipropionitrile and N,N'-bis(2-cyanoethyl)ethylenediamine with acrylonitrile at a temperature of from about 50° C. to about 100° C. in the presence of from about 5 to about 100 per cent, based on the total amount of acrylonitrile and amine, of lower alkanoic acid.

3. A process for the cyanoethylation of a weakly basic aliphatic amine which comprises reacting a weakly basic aliphatic amine selected from the group consisting of 3,3'-iminodipropionitrile and N,N'-bis(2-cyanoethyl)-ethylenediamine with acrylonitrile at a temperature of from about 50° C. to about 100° C. in the presence of from about 5 to about 100 percent, based on the total amount of acrylonitrile and amine of acetic acid.

4. A process for the preparation of 3,3',3"-nitrilotripropionitrile which comprises reacting 3,3'-iminodipropionitrile with acrylonitrile at a temperature of from about 50° C. to about 100° C. in the presence of from about 5 to about 100 percent, based on the total amount of acrylonitrile and amine, of acetic acid.

5. A process for the preparation of 3,3',3",3"'-(ethylenedinitrilo)tetrapropionitrile which comprises reacting N,N'-bis(2-cyanoethyl)ethylenediamine with acrylonitrile at a temperature of from about 50° C. to about 100° C. in the presence of from about 5 to about 100 percent based on the total amount of acrylonitrile and amine, of acetic acid.

6. A process for the preparation of 3,3',3"-nitrilotripropionitrile which comprises reaching 3,3'-iminodipropionitrile with acrylonitrile at a temperature of from about 50° C. to about 100° C. in the presence of from about 5 to about 100 percent, based on the total amount of acrylonitrile and amine, of propionic acid.

7. A process for the cyanoethylation of a weakly basic aliphatic amine which comprises reacting a weakly basic aliphatic amine selected from the group consisting of 3,3'-iminodipropionitrile and N,N'-bis(2-cyanoethyl)-ethylenediamine with acrylonitrile at a temperature of from about 50° C. to about 100° C. in the presence of from about 5 to about 100 percent, based on the total amount of acrylonitrile and amine, of benzoic acid.

8. A process for the cyanoethylation of a weakly basic aliphatic amine which comprises reacting a weakly basic aliphatic amine selected from the group consisting of 3,3'-iminodipropionitrile and N,N'-bis(2-cyanoethyl)-ethylenediamine with acrylonitrile at a temperature of from about 50° C. to about 100° C. in the presence of from about 5 to about 100 percent, based on the total amount of acrylonitrile and amine, of para-toluene sulfonic acid.

9. A process for the preparation of 3,3,'3''-nitrilotripropionitrile which comprises reacting 3,3'-iminodipropionitrile with acrylonitrile in the presence of from about 5 to about 100 percent, based on the total amount of acrylonitrile and amine, of an organic acid catalyst selected from the group consisting of lower alkanoic acids, benzoic acid, and para-toluensulfonic acid at a temperature of from about 50° C. to about 150° C.

10. A process for the preparation of 3,3',3'',3'''-(ethylenedrinitrilo)tetrapropionitrile which comprises reacting N,N'-bis(2-cyanoethyl)ethylenediamine with acrylonitrile in the presence of from about 5 to about 100 percent, based on the total amount of acrylonitrile and amine, of an organic acid catalyst selected from the group consisting of lower alkanoic acids, benzoic acid, and para-toluene-sulfonic acid at a temperature of from about 50° C. to about 150° C.

No references cited.